May 6, 1941. O. L. WOODSON 2,241,336

COWL FASTENER

Filed Sept. 14, 1939

INVENTOR
OMER L. WOODSON.
BY
ATTORNEY

May 6, 1941.  O. L. WOODSON  2,241,336
COWL FASTENER
Filed Sept. 14, 1939
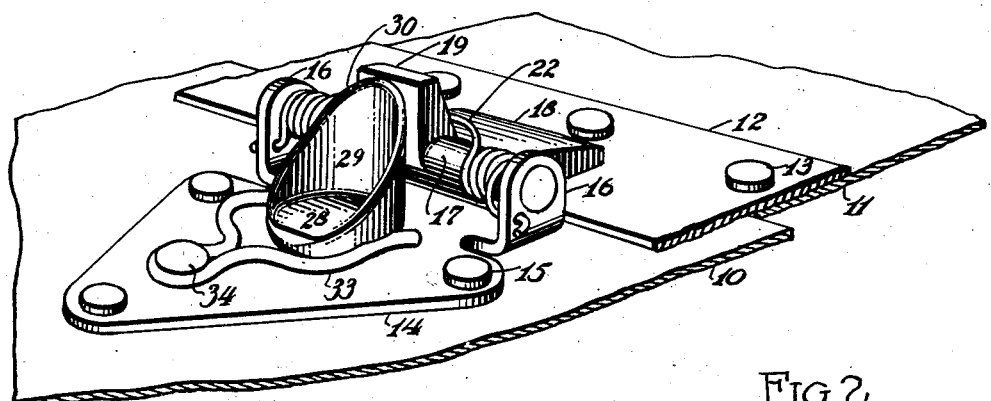
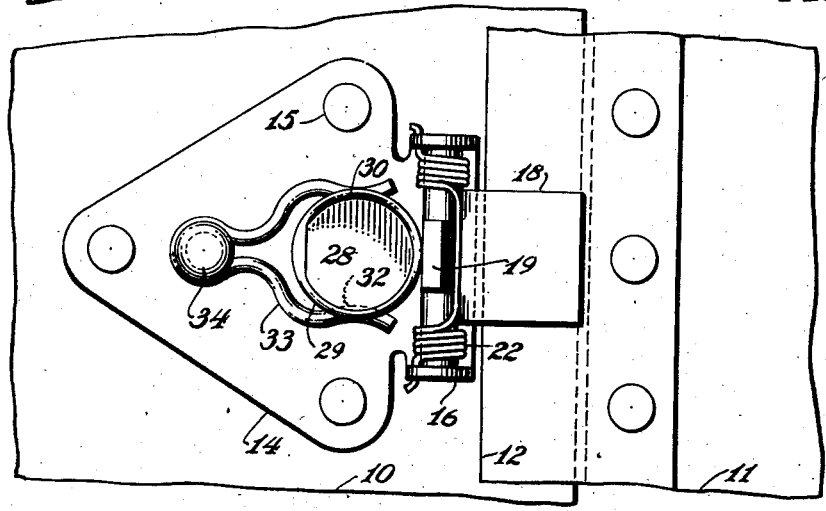
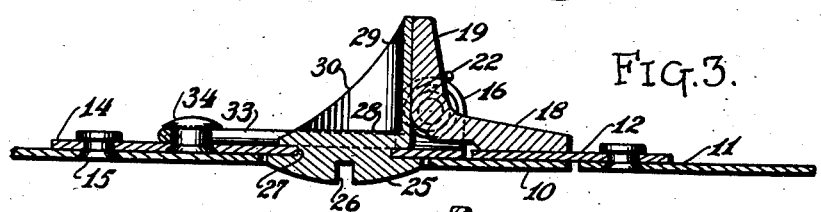
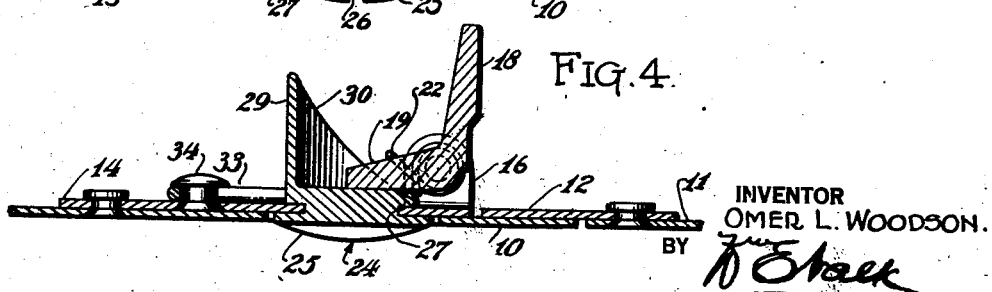
INVENTOR
OMER L. WOODSON.
BY
ATTORNEY Patented May 6, 1941

2,241,336

UNITED STATES PATENT OFFICE 2,241,336

COWL FASTENER

Omer L. Woodson, Eggertsville, N. Y., assignor to Curtiss-Wright Corporation, a corporation of Delaware Application September 14, 1939, Serial No. 294,865

7 Claims. (Cl. 292—229)

This invention relates to fastening devices, and is concerned particularly with an improved locking arrangement adapted for use on aircraft inspection doors and cowling.

A primary object of the invention is to provide a substantially flush, positive acting, self-contained fastening unit for doors, cowlings and the like, a further object being to provide a fastening device which may be secured to one of two elements to be fastened, and wherein no special fittings are required to be secured to the other members.

A further object is to provide an irreversible lock on overlapping flat elements, wherein the lock and an overlapping element embrace the overlapped element, the lock being readily releasable to permit of separation of the two elements.

Further objects will be apparent from reading the annexed specification and claims, together with an examination of the accompanying drawing, in which:

Figure 1:
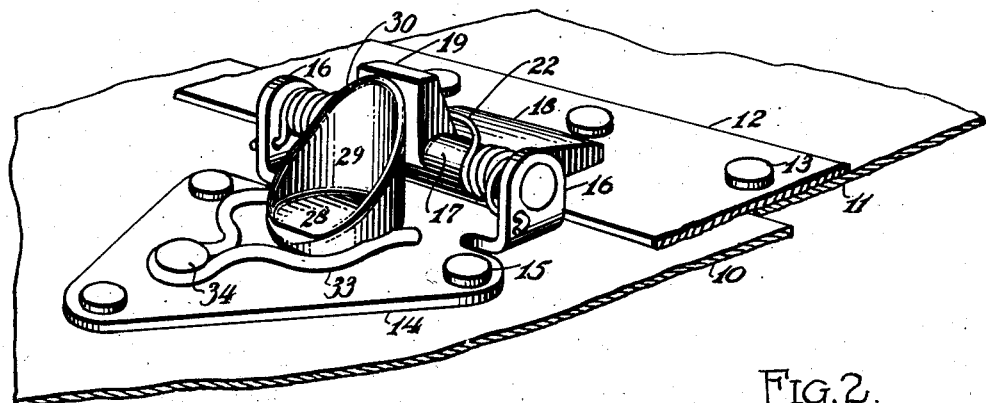
Fig. 1 is a perspective view of the locking assembly.
Figure 2:
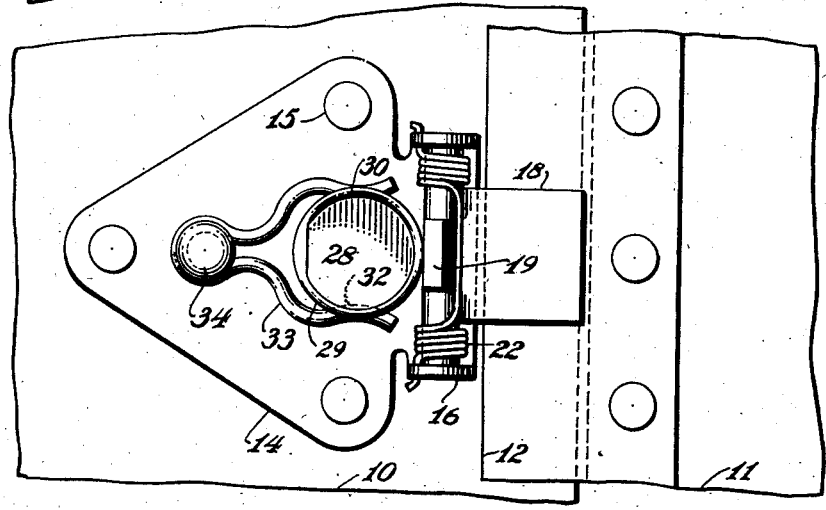
Fig. 2 is a plan.
Figure 3:
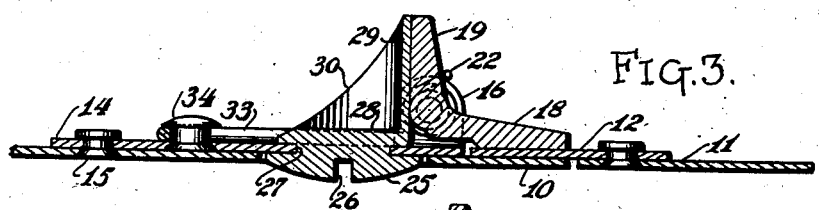
Figs. 3 and 4 are, respectively, sections through the locking device in locking and unlocking positions.

Metal plates adapted to be secured to one another are indicated at 10 and 11, these lying in abutting relation, as shown, but the plate 11 having a lock strip 12 riveted thereto as at 13 which is overlapped by the plate 10. Alternately, the plate 10 could overlap the plate 11, or the portion 12 could be formed as an offset of the plate 11. The locking unit comprises a base plate 14 secured as by rivets 15 to the plate 10. The plate is provided with upturned ears 16 drilled to provide hinge points for a shaft 17 carrying a locking tab 18 and a cam follower 19, the operating faces of the elements 18 and 19 being substantially at right angles to one another. The tab 18 is movable about its pivot between the two positions shown in Figs. 3 and 4; according to Fig. 3, the tab 18 is moved into contact with the plate 12 so that the latter is sandwiched between the tab and the plate 10. When swung into the position of Fig. 4, the tab 18 disengages the plate 12 and allows the plate 10 to be swung away from the plate 11.

Figure 4:
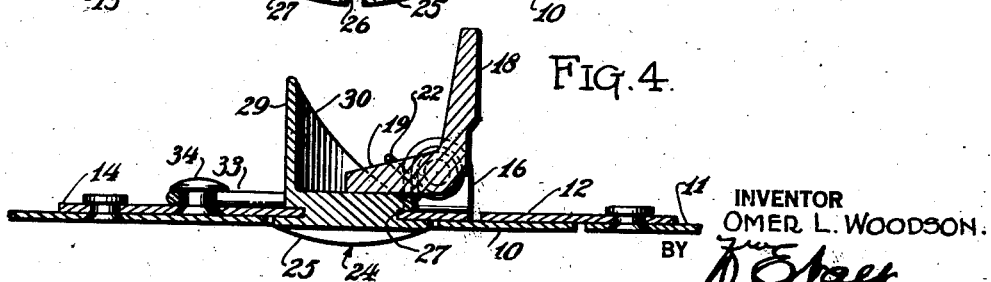

The shaft, tab and cam follower assembly is provided with a spring 22 hooked around the cam follower and engaging the ears 16, said spring normally urging the shaft assembly to the position of Fig. 4. Upon the base plate 14, a cam element 24 is pivoted, said element comprising a head 25 provided with a screw driver slot 26, and a shank 27 engaging an opening in the base 14. On the inner side of the base 14 the element carries a disc 28 from which a cam cylinder 29 extends outwardly, said cylinder being cut off on a slant, as shown, so that the slanting edge 30 forms a cam surface.

If the element 24 be turned so that the high side of the cam is away from the cam follower 19, the tab 18 is raised as in Fig. 4. When the element 24 is turned to 180°, the cam follower 19 rides up the cam edge 30, so that finally, the cylindrical side of the element 29 rests against the cam follower 19 to hold the tab in the locking position of Fig. 3.

The disc 28 is further provided with segmental slots 32 at opposite points thereon for engagement by a bifurcated spring 33 secured to the base 14 by a rivet 34, whereby the element 24 is prevented from inadvertent rotation when the assembly is in locking position.

It will be seen that all of the locking mechanism is carried by the plate 14 which may be applied as desired to a cowling or door structure, the locking mechanism requiring no coacting parts on the door jamb with the exception that the latter must have a sheet metal edge which may be engaged between the edge of the plate 10 and the tab 18. Likewise, the exterior of the locking assembly is wholly free from protuberances which might interfere with smooth air flow thereover when the device is applied to aircraft. Alternately, if extreme exterior smoothness is unnecessary, the head 26 may be formed as a knob for easy manual manipulation.

The invention also contemplates various alternative constructions which would be obvious to those skilled in the art, such, for instance, as forming the tab 18 as a hook to engage flanges or the like on the member 11, and the formation of the cam element 24 with multiple lobes along with multiplication of the tab units on opposite sides of the cam member to lock the plate 14 for more than one plate, such as 11.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A lock for overlapping flat elements comprising a tab pivoted to the underside of the overlapping element on an axis substantially parallel to the edge of the overlapped element, said tab being swingable over and toward the overlapped element to secure same between the tab and the overlapping element, and cam means mounted on the overlapping element for swinging said tab between the securing position and a position wherein the tab is wholly clear of the overlapped element in a direction normal to their planes.

2. A lock for overlapping flat elements comprising a tab pivoted to the underside of the overlapping element on an axis substantially parallel to the edge of the overlapped element, said tab being swingable over and toward the overlapped element to secure same between the tab and the overlapping element, and cam means turnable on an axis normal to the plane of the overlapping element and secured thereto for swinging said tab between said securing position and a position wherein the tab is wholly clear of the overlapped element to allow of relative movement thereof in a direction normal to their planes.

3. A lock for overlapping flat elements comprising a tab pivoted to the underside of the overlapping element on an axis substantially parallel to the edge of the overlapped element, said tab being swingable over and toward the overlapped element to secure same between the tab and the overlapping element, cam means for swinging said tab, resilient means urging said tab away from the overlapped element, and a cam mounted on the overlapping element operable to irreversibly move said tab toward the overlapped element for locking both elements, and away from the overlapped element to allow of relative movement of the elements in a direction normal to their planes.

4. A lock for overlapping flat elements comprising a tab pivoted to the underside of the overlapping element on an axis substantially parallel to the edge of the overlapped element, said tab being swingable over the overlapped element to secure same between the tab and the overlapping element, a bellcrank arm on said tab, and a cam element rotatable in the overlapping sheet engageable with said arm to move said tab into engagement with the overlapped element.

5. A locking mechanism comprising a base plate having upturned ears, a shaft pivoted in said ears on an axis parallel to the base plate having a tab and a cam follower extending from the shaft substantially at right angles to each other, and a cam rotatable in the base plate having its cam face engageable with said cam follower to turn the shaft and tab upon its axis.

6. A locking mechanism comprising a base plate having upturned ears, a shaft pivoted in said ears on an axis parallel to the base plate having a tab and a cam follower extending from the shaft substantially at right angles to each other, a cam fully rotatable in the base plate having its cam face engageable with said cam follower to turn the shaft and tab upon its axis, said cam having a notch and resilient means engageable in said notch to hold the cam in adjusted position.

7. A locking mechanism comprising a base member having brackets disposed thereabove, an element carried by said brackets and movable on an axis parallel to the base member, said element comprising a locking face and another face, a cam element rotatably mounted on the base member on an axis normal to the bracket-carried element axis and including a cam face engageable with the other said face of said bracket-carried element to move the latter about its axis.

OMER L. WOODSON.